Feb. 11, 1936.　　　R. E. HYDE ET AL　　　2,030,594
ASSEMBLY TABLE
Filed May 25, 1934　　　2 Sheets-Sheet 1
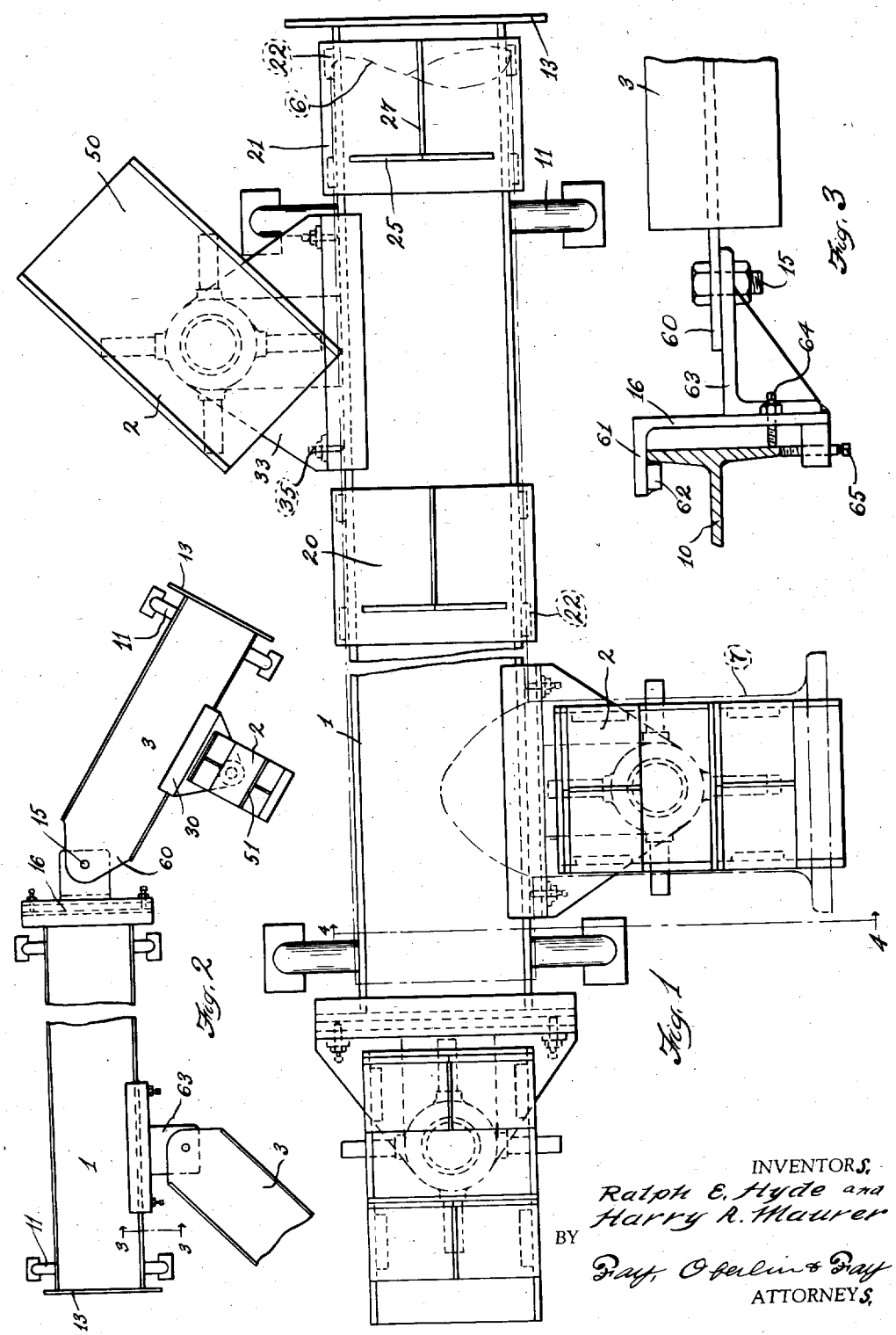
INVENTORS.
Ralph E. Hyde and
Harry R. Maurer
BY
ATTORNEYS.

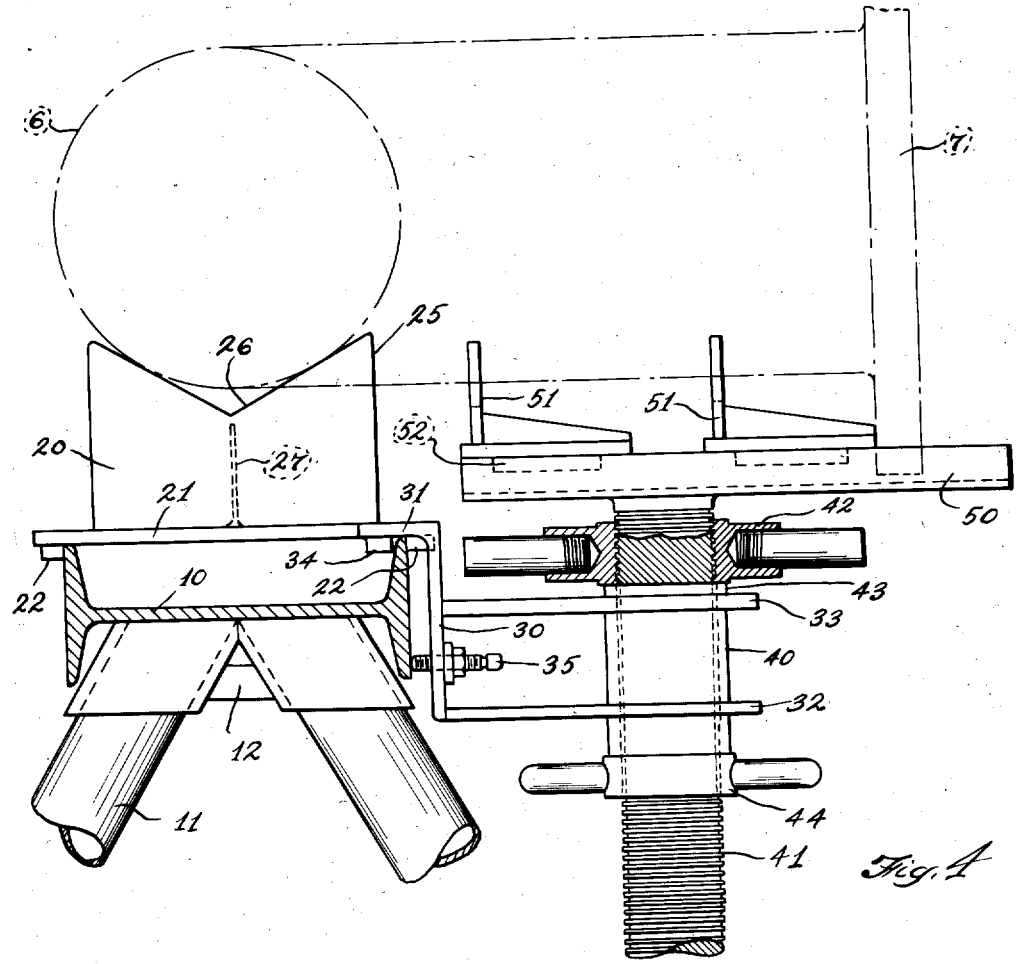
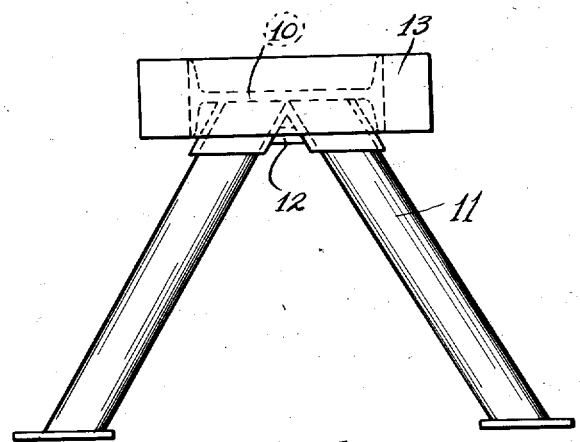

Patented Feb. 11, 1936

2,030,594

UNITED STATES PATENT OFFICE 2,030,594

ASSEMBLY TABLE

Ralph E. Hyde, Cleveland, and Harry A. Maurer, Novelty, Ohio, assignors to The Oster Manufacturing Company, Cleveland, Ohio, a corporation of Ohio Application May 25, 1934, Serial No. 727,460

9 Claims. (Cl. 29—89)

This invention is directed to a table which can be used for assembly of pipes for welding purposes, particularly for the insertion of side branches into relatively large size pipes, although the invention is also useful for holding pipe sections to be joined end to end directly or at various angles, and for holding fittings to be welded to pipes. Among its purposes and advantages are the provision of means for a wide variety of different angular relations and size relations in the parts to be welded and for the avoidance of positive clamps and fastening means, reliance being had entirely upon gravity to hold the parts in place. The invention does not, however, preclude the use of fastening means in exceptional situations where they may be necessary. A further purpose of the invention is to enable the user to carry on several welding operations simultaneously so that, for example, a number of side branches may be welded onto a pipe at the same time, and end welding may also be done at the same time.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:

Fig. 1 is a plan view of the assembly table with certain attachments; Fig. 2 is a similar view on a smaller scale of a table with other attachments; Fig. 3 is a sectional detail, enlarged, on the line 3—3 of Fig. 2; Fig. 4 is a section and elevation on the line 4—4 of Fig. 1; and Fig. 5 is an end elevation of the table, without attachments, on the same scale as Fig. 1.

In the preferred form shown, the assembly table which constitutes the invention comprises a bed indicated by reference character 1, and certain adjuncts, chief of which are brackets 2 which are applied either to the sides or the end of the bed 1, in any position desired, and bench extensions 3, similarly used, such extensions also having certain functions of the main table. In operation, the principal piece of pipe, shown in dotted lines and indicated by reference character 6, will be supported on the bed, by means hereafter described, and the parts to be welded thereto, such as the branch 7, will be supported on the brackets or on the table extension. The use of the table extensions 3 is, for the most part, for pipes longer than can be conveniently placed on brackets.

The bed 1, as noted, is preferably made of an I-beam 10 laid on its side and supported at each end by legs 11 which may be diverging pipes welded to the under side of the I-beam and cross braced as at 12. For most purposes it is contemplated that the bed 1 will be about 8 feet long made of an I-beam 12 inches wide and adapted to handle all pipe sizes within economical welding range, up to the limits of diameter imposed by the apparatus. It will be understood of course that the apparatus may be made in various sizes, that mentioned being the most useful under present conditions. A preferred end construction for the bed comprises a plate 13 of the same height as the beam flange and somewhat longer than the beam width, welded vertically across the end of the beam 10 as seen in Fig. 5. The purpose of this is to let a bracket 2 be hung on the end, as shown on the left of Fig. 1, in the same manner as on the side; or an extension 3, as at the right of Fig. 2. The extension 3 will preferably be made of the same material as the bed, but a little shorter, pivoted at one end, as at 15, to a wide hook 16, and supported by legs 11 at its far end.

Two or more seats 20 are carried on the top of the table 1 or extension 3, guided by the beam flanges and ordinarily held in position only by their own weight and the weight of the pipe which they carry, although the construction of the table is such that clamps, chains, or other fastening means may be used if deemed advisable. These seats 20 in the present exemplification consist of horizontal metal plates 21 slightly wider than the I-beam 10 and of sufficient length to give them steadiness, and guided along the beam flanges by lugs 22. Vertical plates 25 are transversely secured near one end of the horizontal plates 21, these vertical plates being formed at their top edge with a central V-groove 26 in which any size of pipe can lie and will automatically center itself. Longitudinal braces such as 27 can be employed between the vertical and horizontal plates.

The preferred construction of the brackets 2, best seen in Fig. 4, comprises a hook 30 which may conveniently be formed of a piece of plate material about as long as the width of the I-beam 10 and with a short horizontally directed top flange 31 and two much longer horizontal flanges 32 and 33, respectively at the bottom and about half way up the vertical part of the hook, the short top flange being directed inward and the other two flanges outward. Blocks 34 welded to the under side of the short flange 31 and spaced from the vertical part of the hook serve, with the short flange, to hold the hook on the top of the beam web or on the top of the end plate 13 as the case may be. To adjust the approach of the bottom part of the hook to the beam web, one or more horizontal set screws 35 are used to bear against the beam web near its bottom. These are pivoted with lock nuts in accordance with the usual practice.

The longer flanges 32 and 33 are preferably of roughly triangular outline well rounded off at the apex, as apparent from Fig. 1, and are welded or otherwise fastened along what may be termed the base of the triangle to the vertical portion of the bracket. A vertical tube 40 passes up through these two flanges, 32 and 33, made fast, as by welding, to each. A threaded shaft 41 passes up through this tube, being raised and lowered by an elevating nut 42 resting upon a collar 43 or the top of the flange 33 and locked by a nut 44 against the bottom of the tube 40.

An elevating table 50, preferably a channel with web horizontal and flanges up, is rigidly secured to the top of the threaded shaft. This table 50 is supported at about one-third its length by the shaft 40, welded or otherwise rigid therewith. Thus in the preferred form the longer part of the table 50 extends away from the bed 1, so as to allow a considerable range of angular positioning of the table 50 with respect to the I-beam. Ordinarily two pipe seats 51, similar in construction to those described for use upon the table proper, will be used upon each bracket table. In the illustrative form shown the seats 51 are smaller than the seats 20 and are guided by bottom blocks 52 inside rather than outside the channel flanges.

Referring now to Figs. 1 and 3, the bench extension 3 combines some features of the main table or bed 1, and some features of the brackets 2. It may be attached to the bed in any desired location and at any angle within its limits of movement. Preferably it is made of such an I-beam as the beam 10, with web extension forming a tongue 60 narrowed about the pivot 15. The wide hook 16, to which the tongue 60 is pivoted, is similar in structure to the bracket 30, and in the preferred form best illustrated in Fig. 3 includes a top flange 61 to rest on the upper flange of the beam 10 or the upper edge of the end plate 13, as the case may be, with a lug 62 to catch inside the flange or plate. A stout shelf 63 projects from the hook 16, carrying the pivot 15 and also supporting the tongue 60. Horizontal set screws 64 and upward vertical set screws 65 respectively adjust the vertical angle of the bracket 16, and clamp it against lifting.

The far end of the bench extension is supported by legs 11, and may be terminated by an end plate 13.

In the use of the assembly table any number of bench extensions 3 and brackets 2 may be used together in any combined arrangement desired, some examples being illustrated in Figs. 1 and 2. The pipe seats 20 are suitably disposed along the bed 1 to support the pipe 6 and at the same time not be in the way of cutting or welding operations. Brackets 2 are appropriately placed along the sides or at the ends of the bed 1 or extension 3 according to what is to be done. The bracket tables 50 are elevated to the proper height to bring the branch such as 7, which of course may not be of the same diameter as the main pipe, to the right height for welding, this height adjustment being accomplished by the elevating nut 42, and is then set at the proper angle and locked by the bottom nut 44. The proper horizontal angular adjustment, either flat or tilted, is given by the set screws 35. After the bracket table 50 is adjusted in position, the pipe branch 7 is laid on the seats 51 and held in place by gravity, or it may be clamped or chained.

It will be appreciated that instead of the form of pipe seats 20 and 51 herein shown, of general utility, special seating and holding arrangements may be employed on any parts of the apparatus, and also that, although gravity is usually sufficient for holding purposes, chains or other clamping means may also be resorted to.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention.

1. A pipe welding bracket comprising a hook adapted to engage the edge of a bed, a mechanism carried by said bracket for adjusting the vertical angle of the hook to the bed, pipe-carrying apparatus supported by said bracket, and mechanism supporting said pipe-carrying apparatus on said bracket and comprising apparatus for elevating and for turning said pipe-carrying apparatus.

2. In combination in an assembly table having peripheral flanges, brackets supported upon said flanges, pipe supporting seats adapted to be positioned longitudinally on said table and including guide elements engageable with said peripheral flanges, devices for adjusting said brackets at an angle to a horizontal plane, said brackets each including an auxiliary table, seats movable upon said table and guide elements carried by said seats engageable with edge elements of said auxiliary table.

3. An assembly table comprising a bed proper composed of an I-beam laid on its side, an end plate substantially equal in height to the flange height of said beam, pipe seats movable on said table; said seats comprising a plate and lugs attached thereto for guiding engagement with the flange of the I-beam, and an upright plate secured to said first-named plate in a position transverse to the I-beam, said plate being notched in its top to position a pipe.

4. An assembly table comprising a pipe-supporting bed composed of a beam having edge flanges, pipe seats movable on said table comprising a horizontal plate and a grooved upright plate secured to said horizontal plate transversely to the beam length, said horizontal plate having guiding engagement with the flange, brackets engageable with the periphery of said bed, said brackets comprising a hook adapted to engage the inside and top of said flange and a member well down on said hook adapted to bear against the outside of the flange towards the bottom, outwardly-extending plates transverse to said hook and secured thereto, a vertically-movable standard supported by said plates, and an auxiliary table carried by the top of said standard, the end of said auxiliary table clearing the edge of said bed and movable in angular relation thereto.

5. A pipe assembly table comprising means for supporting a pipe longitudinally and centrally thereof, said means including portions which contact the bed only on substantially upright surfaces and on top surfaces of said bed, and other means for holding pipe elements to be attached to said pipe, said other means being attached to the bed at one side of the main pipe position attaching elements for said means, which attaching elements include bed-engaging portions which contact only the bed edge and only substantially upright surfaces and top surfaces of said edge, whereby said other means are removable and attachable without interfering with the first-named supporting means or the main pipe.

6. An assembly table comprising in combination a bed having flanged sides, and pipe seats adapted to be slid therealong and supported thereby at selected positions by gravity only, said seats including guiding elements having vertical faces adapted for guiding engagement with both said sides, said guiding elements being free from extension beneath any bed elements, whereby said seats are removable by direct lift, said seats also including elements adapted to support a pipe section thereon by gravity.

7. An assembly table comprising in combination a bed, said bed including a peripheral portion of substantial height, elements movable thereon but guided thereby including seats for supporting and positioning a pipe on said bed by gravity only, and additional pipe-supporting means adapted to be attached to the periphery only of said bed, said additional means including a body having spaced bed-engaging instrumentalities adapted to engage a portion of the bed between them, said additional means being movable to alter their angular relationship to said bed.

8. An assembly table comprising in combination a bed, said bed including a peripheral portion of substantial height, elements movable thereon but guided thereby including seats for supporting and positioning a pipe on said bed by gravity only, and pipe-carrying brackets adapted to be supported from the periphery of said bed, said brackets including spaced bed-engaging instrumentalities adapted to engage a portion of the bed between them, said brackets being movable to alter the height relation between pipe elements carried thereby and said bed.

9. An assembly table comprising in combination a bed, said bed including a peripheral portion of substantial height, elements movable thereon but guided thereby including seats for supporting and positioning a pipe on said bed by gravity only, and pipe-carrying brackets adapted to be supported from the periphery of said bed, said brackets including spaced bed-engaging instrumentalities adapted to engage a portion of the bed between them, said brackets being movable to alter the height and angular relations between pipe elements carried thereby and said bed.

RALPH E. HYDE.
HARRY A. MAURER.